United States Patent
Hernandez et al.

(10) Patent No.: US 11,150,717 B2
(45) Date of Patent: *Oct. 19, 2021

(54) DYNAMIC TRANSMISSION POWER ADJUSTMENT

(71) Applicant: Apple Inc., Cupertino, CA (US)

(72) Inventors: Diego C. Hernandez, San Mateo, CA (US); Harneet Singh Oberoi, San Jose, CA (US); Indranil S. Sen, Cupertino, CA (US); Kevin C. Camilleri, Campbell, CA (US); Raghuram C. Kamath, San Jose, CA (US); Vusthla Sunil Reddy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/569,383

(22) Filed: Sep. 12, 2019

(65) Prior Publication Data
US 2020/0004312 A1 Jan. 2, 2020

Related U.S. Application Data

(63) Continuation of application No. 15/161,776, filed on May 23, 2016, now Pat. No. 10,416,747.

(51) Int. Cl.
*G06F 1/00* (2006.01)
*G06F 1/3212* (2019.01)
*G06F 1/3234* (2019.01)
*G06F 1/3203* (2019.01)
*G06F 1/26* (2006.01)

(52) U.S. Cl.
CPC ............ *G06F 1/3212* (2013.01); *G06F 1/325* (2013.01); *G06F 1/26* (2013.01); *G06F 1/3203* (2013.01); *Y02D 10/00* (2018.01)

(58) Field of Classification Search
CPC .............................. G06F 1/3212; G06F 1/3296
USPC ........................................................ 713/300
See application file for complete search history.

(56) References Cited

U.S. PATENT DOCUMENTS

| 6,728,550 | B1 * | 4/2004 | Bohnke | H04W 52/04 370/321 |
|---|---|---|---|---|
| 6,760,596 | B1 * | 7/2004 | Fiorini | H04W 28/18 455/522 |
| 8,095,091 | B1 * | 1/2012 | Kopikare | H04W 52/241 455/127.1 |
| 8,429,282 | B1 * | 4/2013 | Ahuja | H04L 47/19 709/229 |
| 9,265,012 | B2 | 2/2016 | Garg et al. | |
| 9,480,028 | B1 * | 10/2016 | Frieh | H04W 52/367 |

(Continued)

*Primary Examiner* — Volvick Derose
(74) *Attorney, Agent, or Firm* — Fletcher Yoder PC

(57) ABSTRACT

A technique for dynamically adjusting power use of an input/output (I/O) interface of an electronic device is provided. The electronic device includes an input/output (I/O) interface that facilitates electronic communications with a receiving electronic device, at a particular transmission rate that is dynamically changeable by the electronic device. Transmission power and transmission rate adjustment circuitry determines whether a step-down in a transmission power used for signal transmission at the particular transmission rate is desirable. When desirable, the transmission power is dynamically adjusted down one step, such that less power is used by the I/O interface during the electronic communications.

20 Claims, 9 Drawing Sheets

(56) References Cited

U.S. PATENT DOCUMENTS

| | | | | |
|---|---|---|---|---|
| 2003/0036408 A1* | 2/2003 | Johansson | H04W 88/08 | 455/560 |
| 2004/0062201 A1* | 4/2004 | Deshpande | H04L 47/29 | 370/235 |
| 2006/0222126 A1* | 10/2006 | Edwards, Jr. | H04L 7/02 | 375/354 |
| 2006/0233178 A1* | 10/2006 | Lu | H04L 1/0001 | 370/395.21 |
| 2007/0201393 A1* | 8/2007 | Srikrishna | H04W 52/286 | 370/318 |
| 2007/0268110 A1* | 11/2007 | Little | G07C 9/00309 | 340/5.62 |
| 2008/0053207 A1 | 3/2008 | Burgan et al. | | |
| 2008/0144501 A1* | 6/2008 | Nagy | H04W 28/22 | 370/235 |
| 2008/0273502 A1* | 11/2008 | Zeira | H04L 1/203 | 370/332 |
| 2010/0008338 A1 | 1/2010 | Tsfati et al. | | |
| 2010/0150000 A1* | 6/2010 | Sakata | H04L 5/0023 | 370/252 |
| 2010/0167657 A1* | 7/2010 | Molnar | H04W 24/10 | 455/67.11 |
| 2010/0197340 A1* | 8/2010 | Lin | H04W 52/08 | 455/522 |
| 2011/0081858 A1* | 4/2011 | Tolentino | H04W 52/245 | 455/41.2 |
| 2011/0149164 A1* | 6/2011 | Goldberg | H04W 72/1215 | 348/607 |
| 2012/0105729 A1* | 5/2012 | Stopler | H04N 21/632 | 348/723 |
| 2012/0272080 A1* | 10/2012 | Hou | G06F 1/3206 | 713/322 |
| 2013/0089044 A1* | 4/2013 | Park | H04W 52/28 | 370/329 |
| 2013/0110988 A1* | 5/2013 | Park | H04N 21/4622 | 709/219 |
| 2014/0010209 A1* | 1/2014 | Hakola | H04W 76/14 | 370/336 |
| 2014/0011456 A1* | 1/2014 | Gao | H04W 52/241 | 455/63.1 |
| 2014/0072300 A1* | 3/2014 | Shih | H04Q 11/0067 | 398/45 |
| 2014/0274179 A1* | 9/2014 | Zhu | H04W 52/243 | 455/509 |
| 2014/0362723 A1* | 12/2014 | Garg | H04W 52/267 | 370/253 |
| 2015/0032915 A1* | 1/2015 | Hur | G06F 3/0613 | 710/29 |
| 2015/0282195 A1* | 10/2015 | Farhadi | H04W 52/143 | 370/229 |
| 2015/0334665 A1* | 11/2015 | Brown | H04W 72/0473 | 370/311 |
| 2016/0150549 A1* | 5/2016 | Kim | H04W 72/085 | 370/329 |
| 2016/0212715 A1* | 7/2016 | Chen | H04W 52/04 | |
| 2016/0227432 A1* | 8/2016 | Freeman | H04W 72/0453 | |
| 2016/0227442 A1* | 8/2016 | Hao | H04W 4/027 | |
| 2017/0171884 A1* | 6/2017 | Niu | H04W 74/085 | |

* cited by examiner though the detailed description and upon reference to the drawings in which:
DYNAMIC TRANSMISSION POWER ADJUSTMENT

CROSS-REFERENCE TO RELATED APPLICATIONS

This application is a continuation of U.S. patent application Ser. No. 15/161,776, filed May 23, 2016, and entitled "Dynamic Transmission Power Adjustment", which is incorporated by reference herein in its entirety.

BACKGROUND

This disclosure relates to efficient electronic communication between electronic devices using dynamic transmission power adjustment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern electronic devices often include electronic communications capabilities. Devices such as cellular telephones, tablet computers, laptop computers, personal computers, televisions, headphones, watches, printers, and cameras all may use electronic communications capabilities to transmit and receive data. The electronic communications capabilities may include wireless or wired communications capabilities. Wireless communications capabilities may include, for example, WiFi (IEEE 802.11) or Bluetooth® (IEEE 802.15). Wired communications capabilities may include, for example, an Ethernet port running the Transmission Control Protocol/Internet Protocol (TCP/IP).

These electronic communication capabilities may consume a substantial amount of power. Indeed, the impact of these communication capabilities on an electronic device may be magnified when the electronic device is portable and uses batteries that hold a finite amount of energy.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to devices and methods to conserve power during electronic communication between electronic devices, while retaining electronic transmission and/or reception quality. Indeed, electronic communication may represent a substantial amount of the power consumed by an electronic device. Accordingly, to reduce power consumption of the electronic device, the electronic device may reduce the amount of transmission power that is used to transmit data at a particular transmission rate, provided that a level of quality of transmission may be maintained at the reduced transmission power for a particular transmission rate. The electronic device may determine, for instance, whether a threshold data throughput of the electronic transmission can be maintained at the reduced transmission power for the particular transmission rate. If the threshold data throughput can be maintained, the transmission power for the particular transmission rate is reduced, potentially resulting in additional energy efficiency of the electronic device.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
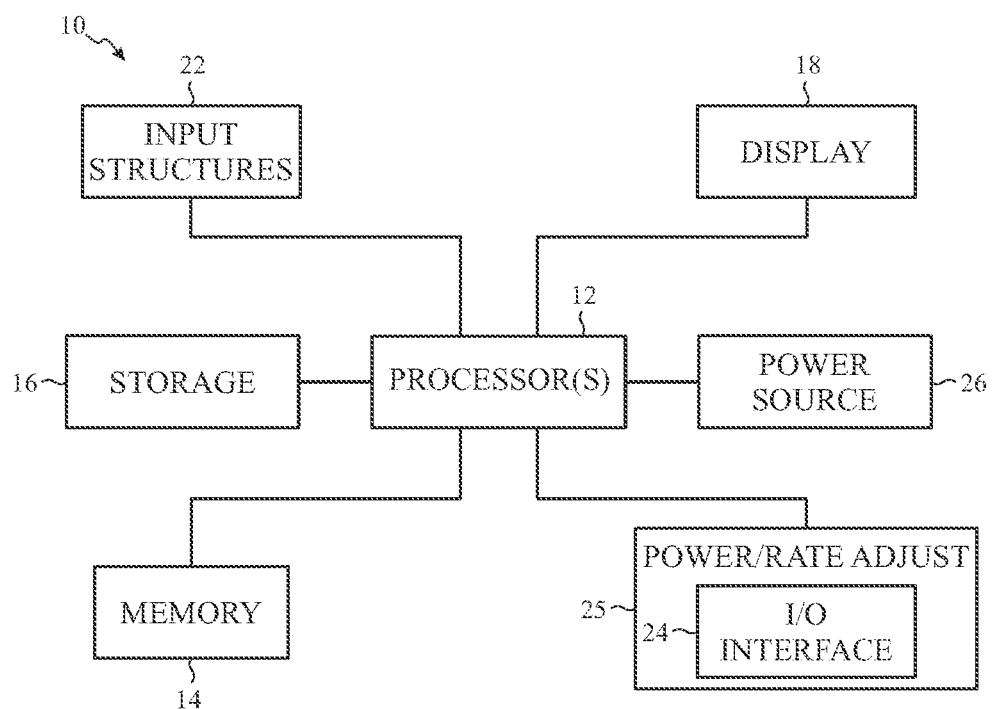
FIG. 1 is a schematic block diagram of an electronic device including an I/O interface that may be controlled at least in part by transmission rate adjustment and/or an adjustment of transmission power, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Further, as used herein, the transmission power refers to an amount of power consumed to transmit a particular amount of data via electronic communication at a particular transmission rate. The transmission rate may refer to a rate at which electronic communication information is processed by a transmitting electronic device.

Power consumption by electronic communication represents a substantial amount of the total power consumption of many electronic devices. To reduce the power consumption during electronic communication, an electronic device may dynamically adjust a transmission rate and/or a transmission power of electronic communications. These adjustments may improve the energy efficiency of the electronic device by reducing power consumption due to electronic communication while retaining the quality of the electronic communication. As discussed in greater detail below, the electronic device transmission rates and/or transmission power used at maintained transmission rates may be dynamically adjusted based upon certain characteristics of the electronic device, characteristics of the use of the electronic device, characteristics of the communication and/or communication channels of the electronic device, etc. For example, to facilitate electronic communications, electronic devices may generate and transmit communication signals (e.g., electrical signals), which may be received and interpreted by receiving electronic devices. The transmission power used to generate and transmit these signals may directly impact the transmission. For example, as the transmission power increases, the electrical signals may become stronger, resulting in a higher likelihood that the signals will be correctly detected by the receiving device. However, in certain instances, it may be beneficial to conserve energy by reducing the transmission power, especially in situations where there is a preference of energy conservation over transmission quality.

With these features in mind, a general description of suitable electronic devices that may dynamically adjust transmission rates and/or transmission power is provided. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24 (that may be at least partially controlled by transmission power and transmission rate adjustment logic 25), and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
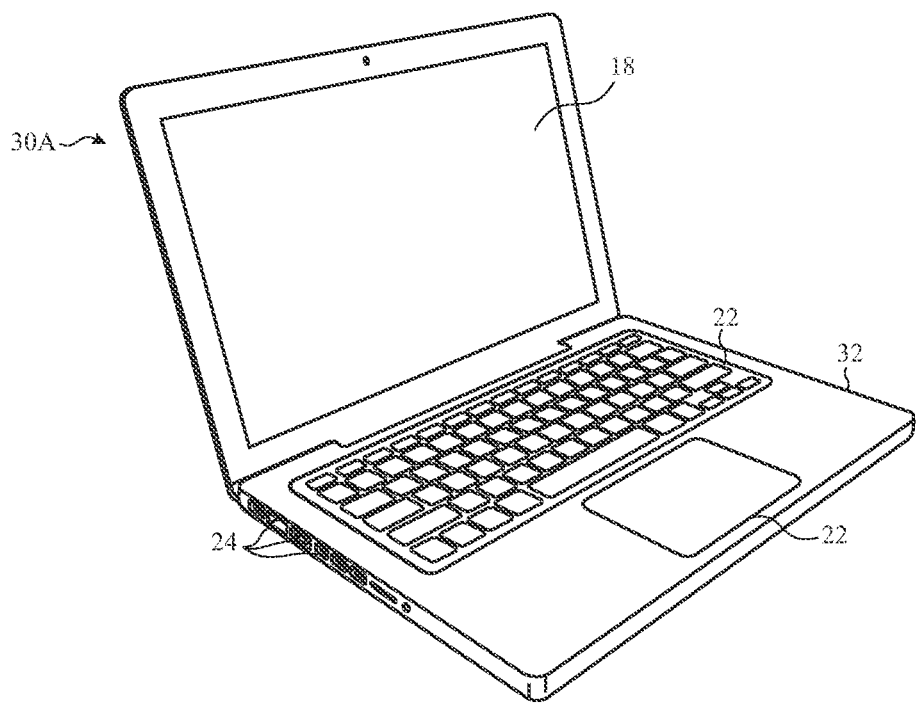
FIG. 2 is a perspective view of a notebook computer representing an embodiment of the electronic device of FIG. 1.
Figure 3:
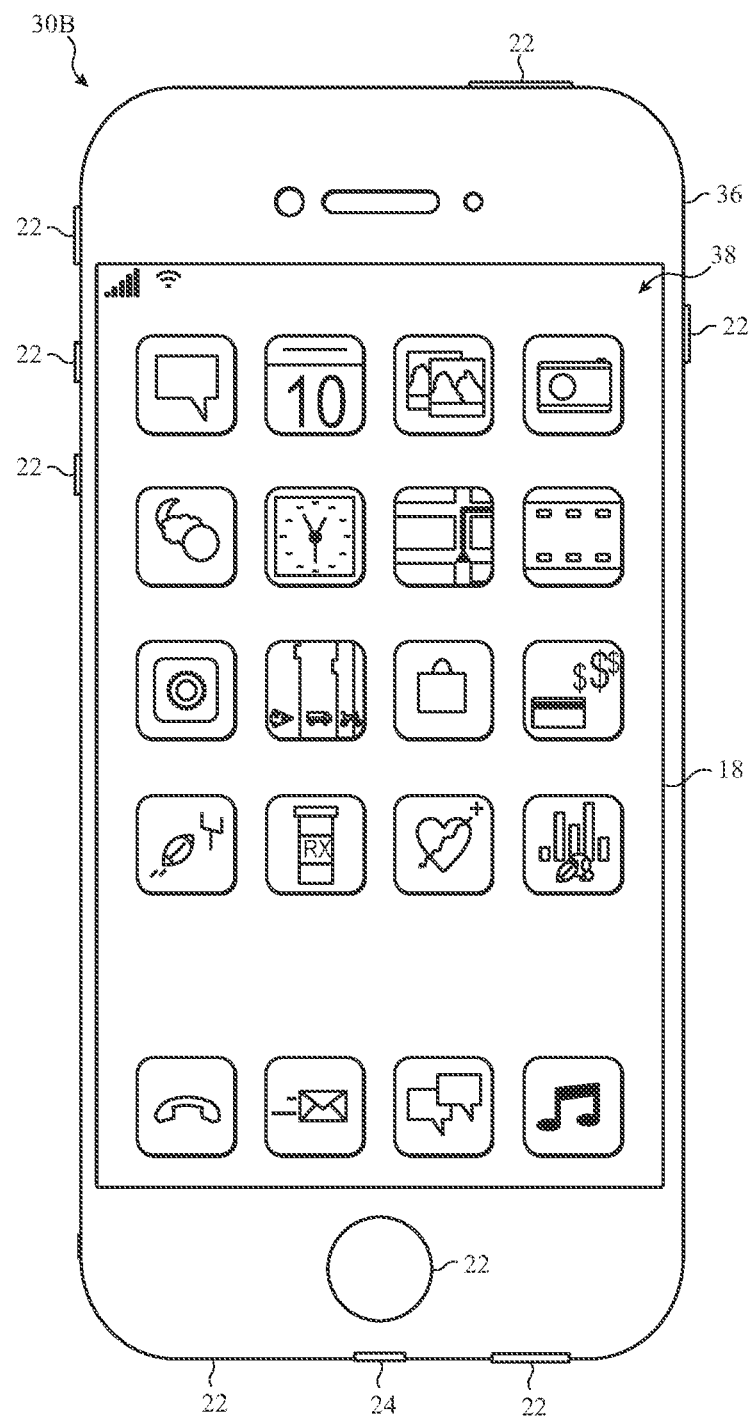
FIG. 3 is a front view of a hand-held device representing another embodiment of the electronic device of FIG. 1.
Figure 4:
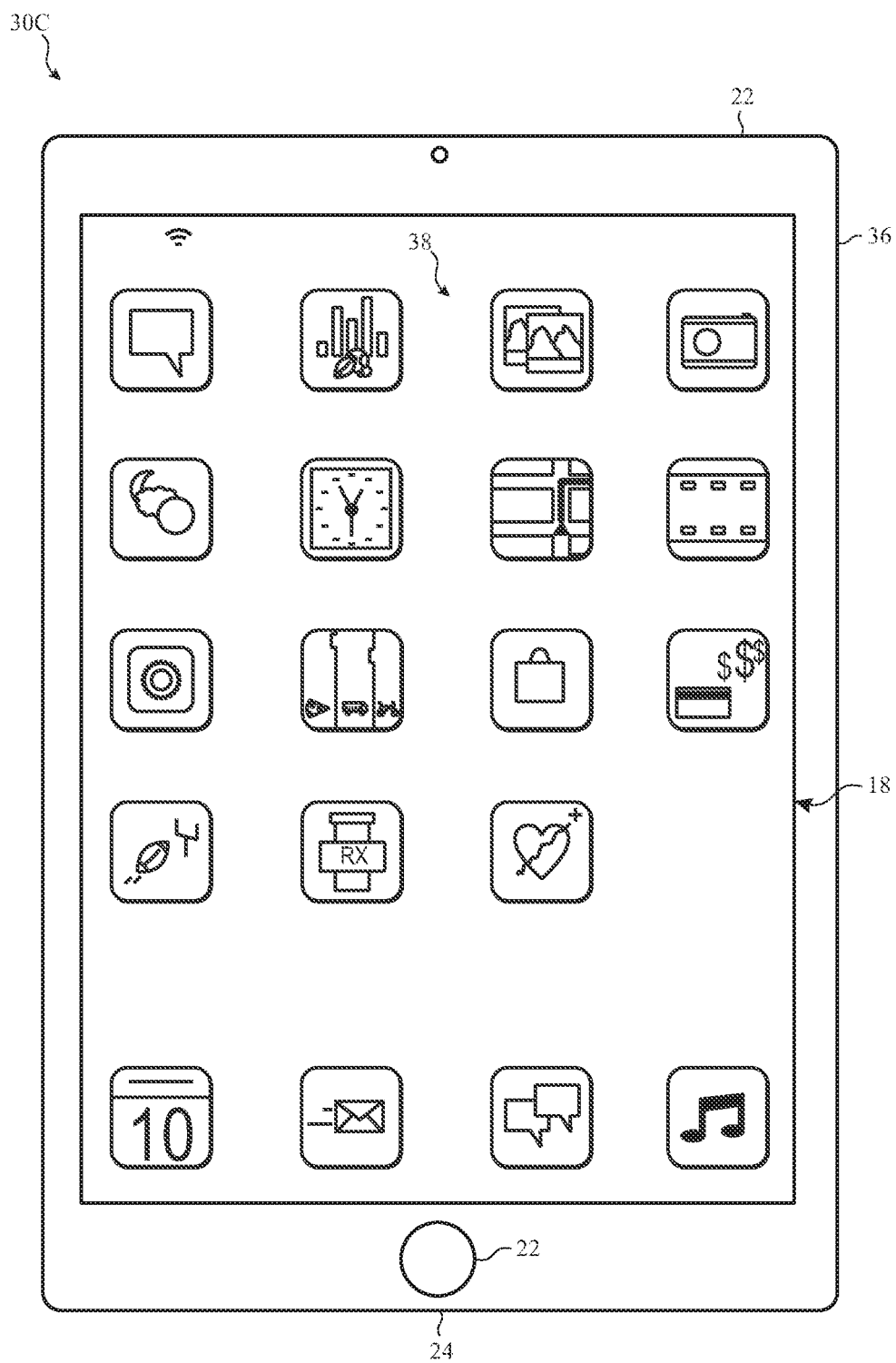
FIG. 4 is a front view of another hand-held device representing another embodiment of the electronic device of FIG. 1.
Figure 5:
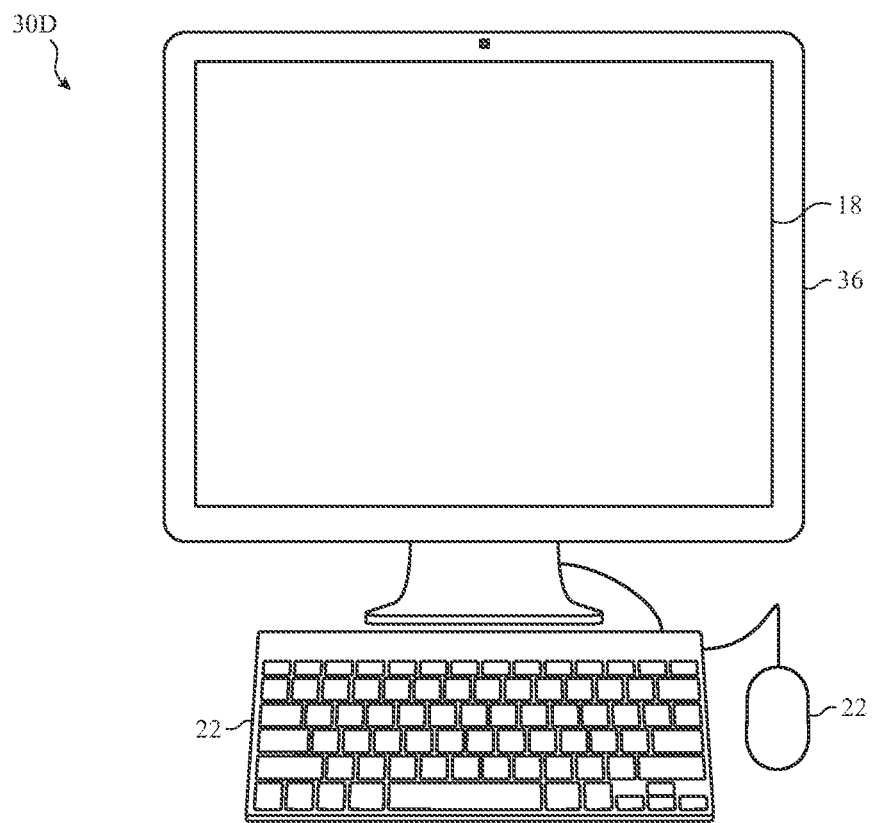
FIG. 5 is a front view of a desktop computer representing another embodiment of the electronic device of FIG. 1.
Figure 6:
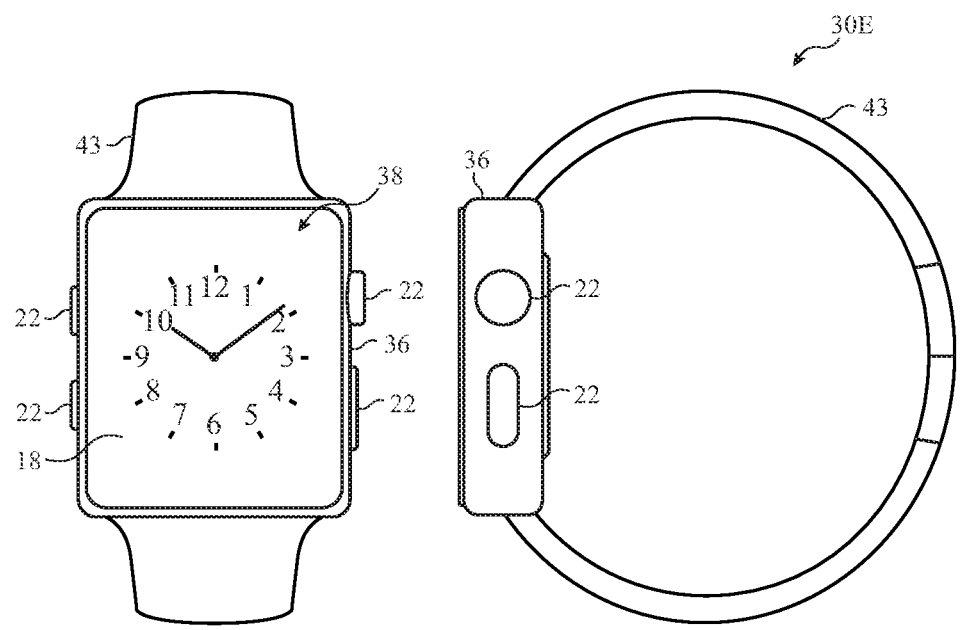
FIG. 6 is a front view of a wearable electronic device representing another embodiment of the electronic device of FIG. 1.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various methods. These methods may include programs or instructions executed by the processor(s) 12 that may be stored in any suitable article of manufacture that includes one or more tangible, computer-readable media at least collectively storing the instructions or routines. For example, the memory 14 or the nonvolatile storage 16 may be any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities, including those discussed in particular below.

The display 18 may be any suitable electronic display that may allow users to view graphics generated on the electronic device 10. The display 18 may be a liquid crystal display (e.g., LCD) or a display with self-emissive pixels (e.g., LED, OLED, AMOLED, uLED). Touch screen capabilities may allow people to interact with a user interface of the electronic device 10 via the display 18. The input structures 22 of the electronic device 10 may enable a user to interact with the electronic device 10 (e.g., pressing a button to increase or decrease a volume level).

The I/O interface 24 may enable electronic device 10 to interface with various other electronic devices. The I/O interface 24 may include various communications interfaces, such as universal serial bus (USB) ports, serial communications ports (e.g., RS232), Apple's Lightning® connector, or other communications interfaces, such as interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As mentioned above, the I/O interface 24 may be controlled, at least partially, by the transmission power and transmission rate adjustment logic 25. The transmission power and transmission rate adjustment logic 25 may dynamically adjust a transmission rate and/or a transmission power associated with the transmission rate, to optimize communication operations via the I/O interface. For example, the transmission power and transmission rate adjustment logic 25 may enhance power use of the power source 26 by reducing power consumption by the I/O interface 24, when reduced power operation of the I/O interface 24 will maintain a desired quality of electronic communication.

First, the transmission power and transmission rate adjustment logic 25 may adjust the transmission rate to reduce power consumption by the electronic device 10. Indeed, certain communications applications may be able to use less bandwidth than other communications applications and, thus, may be able to use a lower transmission rate without loss of quality. In one particular example, electronic communications (e.g., transmission and/or reception of data) involving streaming high-definition video data may involve a higher data throughput than streaming low-definition video. Further, playing a network-based game may involve even less data throughput than either streaming application. Accordingly, a transmission rate for high-definition video data may be dynamically adjusted to be higher than the low-definition video streaming, which may be dynamically adjusted to be higher than the gaming application.

Second, for a particular transmission rate, the transmission power and transmission rate adjustment logic 25 may reduce the transmission power consumed to generate communication signals that are being transmitted. The amount of transmission power used to transmit the communication signals may be directly correlated with signal strength, which may impact quality of communication at the receiving end of the communication channel. In certain situations, communication quality may remain high even without using full transmission power in transmission of the communications signals. Indeed, in some scenarios, it may be beneficial not to use full transmission power in such transmission. Moreover, in some situations, power preservation may take priority over communication quality. For example, returning to the applications discussed above, higher quality communication may be desired with high definition video streaming as compared to network-based game applications (e.g., because the network-based game application may use less data throughput than the high definition video streaming). Accordingly, in network-based game applications, it may be more beneficial to preserve power rather than maintain higher communication quality. Accordingly, for the network-based game application, the transmission power may be adjusted downward, while in the high-definition video streaming application, the transmission power may remain high.

In some embodiments, certain characteristics of the electronic device may impact whether the transmission power and transmission rate adjustment logic 25 more or less aggressively adjusts transmission power consumed by the I/O interface 24. In one embodiment, when an overall power level of the electronic device dips below a threshold level, a "power saving" mode may be implemented. The "power saving" mode may introduce a preference for power saving over higher-quality communication, and thus the transmission power may be reduced more aggressively. Further, in some embodiments, electronic device movement may impact the determination of whether a transmission power decrease may be desirable. For example, an accelerometer, gyroscope or touch sensor may be used to determine whether or not the electronic device is in a state of movement or stability. When in a state of movement (e.g., shaking, etc.), the communication channel between the electronic device and the target electronic device may be less stable than when the electronic device is in a stable position. Accordingly, higher transmission power may be used with moving electronic devices, as opposed to non-moving devices.

Communication characteristics may also impact the transmission power adjustment. For example, when an error rate of the communication is known, this characteristic may be used to discern whether a transmission power adjustment may be warranted. For example, when there are relatively few errors, it may be desirable to lower transmission power and/or increase the transmission rate. In contrast, when there are a relatively high number of errors, the transmission power may be increased and/or the transmission rate may be decreased.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell. As mentioned above, in some embodiments, the transmission power and transmission rate adjustment logic 25 may act to prolong the charge of the power source 26.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10, in the form of a computer, may be a model of a MacBook®, MacBook® Pro, MacBook Air®, iMac®, Mac® mini, or Mac Pro® available from Apple Inc. By way of example, the electronic device 10, taking the form of a computer 30A, is illustrated in FIG. 2 in accordance with one embodiment of the present disclosure. The depicted computer 30A may include a housing or enclosure 32, a display 18, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on the display 18.

FIG. 3 depicts a front view of a handheld device 30B, which represents one embodiment of the electronic device 10 of FIG. 1. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif. The handheld device 30B may include an enclosure 36 to protect interior components from physical damage and to shield them from electromagnetic interference. The enclosure 36 may surround the display 18, which may display a graphical-user-interface 38. Ports of the I/O interfaces 24 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 22, in combination with the display 18, may allow a user to control the handheld device 30B. For example, one of the input structures 22 may activate or deactivate the handheld device 30B, one of the input structures 22 may navigate user interface to a home screen, a user-configurable application screen, and/or activate a voice-recognition feature of the handheld device 30B, while other of the input structures 22 may provide volume control, or may toggle between vibrate and ring modes. Additional input structures 22 may also include a microphone that may obtain a user's voice for various voice-related features, and a speaker to allow for audio playback and/or certain phone capabilities. The input structures 22 may also include a headphone input to provide a connection to external speakers and/or headphones.

FIG. 4 depicts a front view of another handheld device 30C, which represents another embodiment of the electronic device 10 of FIG. 1. The handheld device 30C may represent, for example, a tablet computer, or one of various portable computing devices. By way of example, the handheld device 30C may be a tablet-sized embodiment of the electronic device 10 of FIG. 1, which may be, for example, a model of an iPad® available from Apple Inc. of Cupertino, Calif. Similar to previous electronic device 10 embodiments, the handheld device 30C may include an enclosure 36 to protect and enclose internal components of the handheld device 30C. The handheld device 30C may include one or more port opening for the I/O interface 24. Further, the handheld device 30C may include one or more input structures 22, which may allow a user to control the handheld device 30C. Additionally, the display 18 of handheld device 30C may display a graphical-user-interface 38, which may be controlled by the input structures 22 and/or the display 18.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. As in previous embodiments, a display 18 may be provided. Further, an enclosure 36 may be provided to protect and enclose internal components of the computer 30D. In certain embodiments, a user of the computer 30D may interact with the computer 30D using various peripheral input devices, such as input structures 22 (e.g., a keyboard or mouse), which may connect to the computer 30D via a wired and/or wireless interface.

Similarly, FIG. 6 depicts a wearable electronic device 30E representing another embodiment of the electronic device 10 of FIG. 1 that may be configured to operate using the techniques described herein. By way of example, the wearable electronic device 30E, which may include an enclosure 36 and a wristband 43, may be an Apple Watch® by Apple Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, OLED display, active-matrix organic light emitting diode (e.g., AMOLED) display, and so forth), which may allow users to interact with a graphical-user-interface 38 of the wearable electronic device 30E. Input structures 22 and/or the display 18 may be used to interact with the wearable electronic device 30E.

Figure 7:
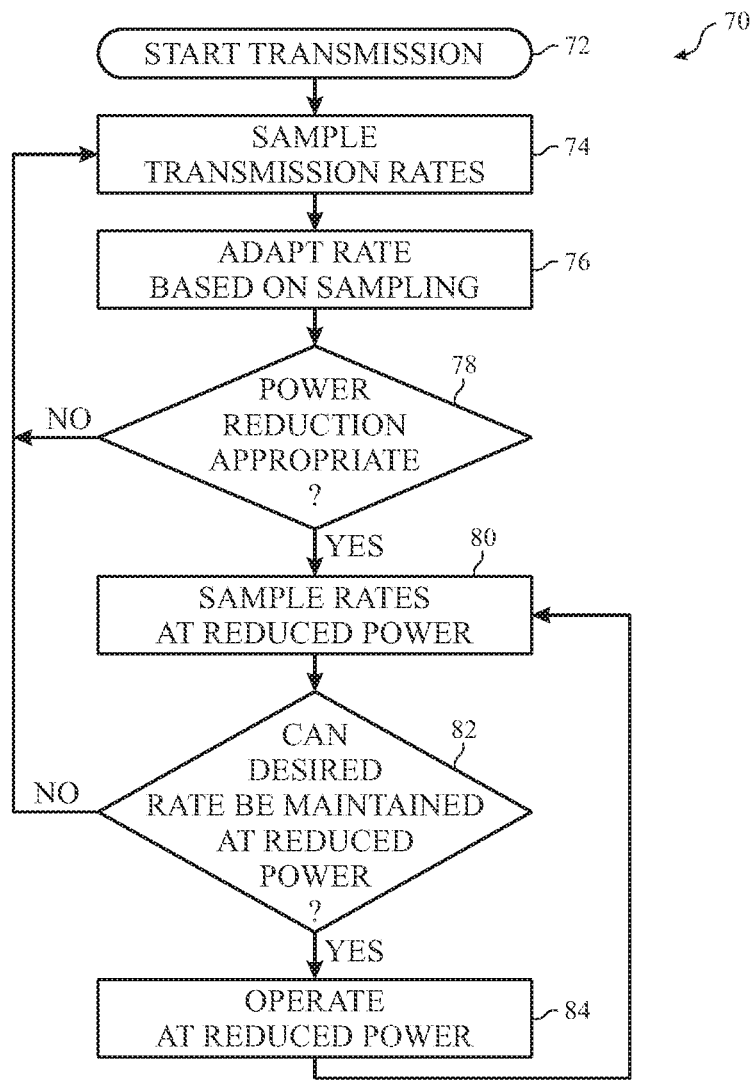
FIG. 7 is a flowchart illustrating a process for dynamically adjusting transmission power of an I/O interface of an electronic device, in accordance with an embodiment.

Turning now to a more detailed discussion of the transmission power and transmission rate adjustment logic 25 of FIG. 1, FIG. 7 is a flowchart illustrating a process 70 for dynamically adjusting transmission power and/or transmission rate of I/O interface 24 communications of an electronic device 10, in accordance with an embodiment. After the start of the transmission (block 72), communication sampling, using the current transmission rate, is implemented (block 74). In some embodiments, sample data throughputs for the transmission may be accumulated and/or other sampling measurements may be derived via data accumulated during this sampling. For example, in some embodiments, a probability of successful communication may be derived based upon error rates that are accumulated during sampling.

Certain transmission rate adjustments may be implemented based upon the data obtained during the sampling (block 76). For example, in some embodiments, a prediction of data throughput at upwardly adjusted and downwardly adjusted transmission rates may be derived using the sample data throughputs and the probability of successful communication data obtained during the communication sampling. When a data throughput at the current transmission rate is higher than the predicted data throughput of the upwardly adjusted and downwardly adjusted transmission rates, the current transmission rate may be maintained. Conversely, when the predicted data throughput of the upwardly adjusted transmission rate or the downwardly adjusted transmission rate is higher than the current data throughput, the transmission rate may be adjusted upward or downward, respectively.

Once the transmission rate is maintained, a determination may be made as to whether transmission power reduction for the current transmission rate may be appropriate (decision block 78). For example, certain factors may not be compatible with transmission power reduction at a particular transmission rate. Accordingly, in some embodiments, the electronic device 10 may determine if such factors exist and attempt transmission power reduction only when incompatible factors do not exist. For example, transmission channel instability may not be compatible with transmission power reduction. Accordingly, transmission channel stability may be predicted using the electronic device 10. For example, rapid and/or frequent movement of the electronic device 10 may cause instability of the transmission channel, due to movement of transmission radios of the electronic device. Accordingly, sensor data (e.g., from Doppler, gyroscopic, accelerometer, etc.) of the electronic device 10 may be used to predict transmission channel stability.

If transmission power reduction is not appropriate, the process 70 may return to sampling transmission rates (block 74), continuing to adapt transmission rates (block 76) and determining whether transmission power reduction is appropriate (decision block 78).

When transmission power reduction is appropriate (e.g., as determined in decision block 78), the transmission power reduction process may be initiated. This process begins with transmission sampling at a stepped-down/reduced transmission power (block 80). For example, during the sampling at the reduced power, a transmission data throughput of the samples at the reduced transmission power is acquired.

A determination is made as to whether the desired transmission rate can be maintained at the reduced transmission power (decision block 82). For example, as will be discussed in more detail below, this determination may be made by comparing the transmission data throughput of the samples at the reduced transmission power with a power adjustment margin (Y %) of the current transmission data throughput (at full transmission power). When the data throughput at the reduced transmission power reaches at least the Y % of the current transmission data throughput, the electronic device 10 may determine that the desired transmission rate can be maintained at the reduced transmission power. Further, a duration counter may determine if the transmission rate can be maintained for a threshold duration.

When the current transmission rate cannot be maintained at the reduced transmission power (e.g., when the data throughput at the reduced transmission power does not reach at least the Y % of the current transmission data throughput), the process 70 may return to sampling at the maintained transmission rate with maintained transmission power (block 74), adapting the transmission rate based upon the sampling (block 76), determining whether transmission power reduction is appropriate (decision block 78), etc. However, when the desired transmission rate can be maintained at reduced transmission power (e.g., when the data throughput at the reduced transmission power reaches at least the Y % of the current data throughput), the transmission power of the electronic device communications may be down-stepped to operate at the reduced transmission power (block 84).

In some embodiments, additional down-stepping may be possible. Accordingly, additional sampling may occur (block 80) at the reduced transmission power, such that an additional determination may be made as to whether the desired transmission rate may be maintained with an additional reduction in transmission power (decision block 82). If the desired transmission rate may be maintained, the electronic device may operate at the further reduced transmission power (block 84). Blocks 80-84 may continue until the desired transmission rate and transmission power is reached, at which point the sampling of block 74 may continue and supplemental discernment of additional transmission rate and/or transmission power adjustments may be made, based upon changing circumstances.

Figure 8:
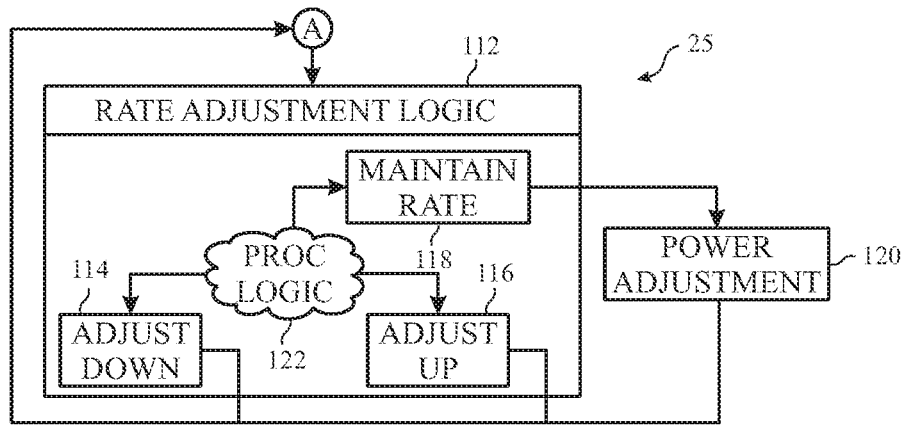
FIG. 8 is a flowchart illustrating rate adjustment logic and transmission power adjustment logic, in accordance with an embodiment.

FIG. 8 is an illustration of the transmission power and transmission rate adjustment logic 25 of FIG. 1, in accordance with an embodiment. In particular, FIG. 8 illustrates transmission rate adjustment logic 112 and transmission power adjustment logic 120. As previously mentioned in the discussion of FIG. 7, after the transmission starts (block 72 of FIG. 7), the sampling process (block 74 of FIG. 7) may begin. During sampling, data (e.g., data regarding the probable success of transmission and/or sample data throughput of samples at the current transmission rate) may be used to predict throughput of adjusted transmission rates.

Once the sampling is completed and the statistics are calculated, the transmission rate adjustment logic 112 may include processing logic 122 to adjust the transmission rate down (block 114), adjust the transmission rate up (block 116), or maintain the current transmission rate (block 118). For example, in some embodiments, the transmission rate may be adjusted up or down based upon a predicted data throughput at the adjusted transmission rates (e.g., based upon the probable success of transmission and/or sample data throughput. Transmission rate adjustments may continue, via resampling and recalculation of statistics, until the transmission rate stabilizes (e.g., maintained at block 118). Once the transmission rate is maintained, transmission power adjustment logic 120 may be implemented for the maintained transmission rate.

Figure 9:
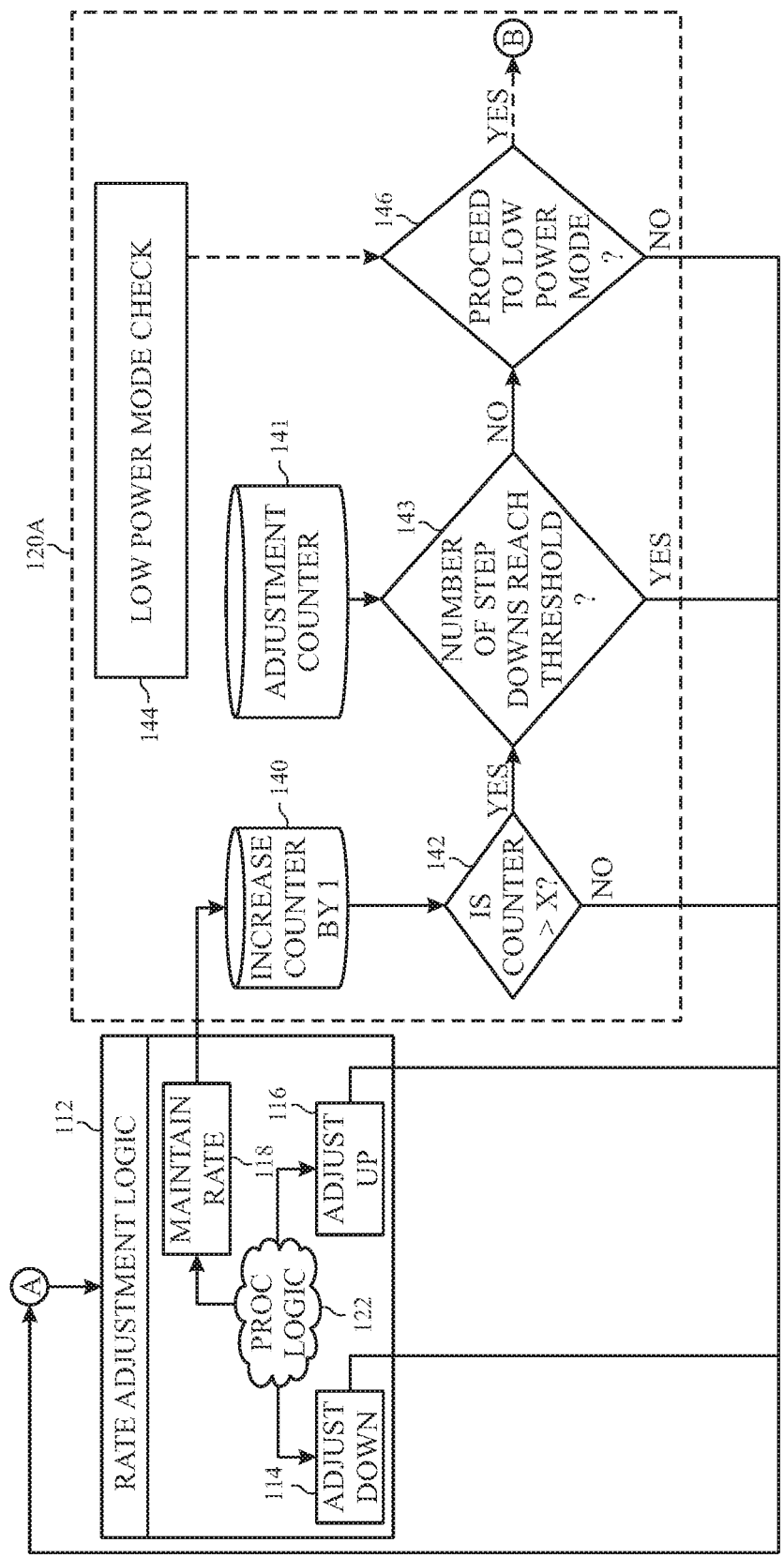
FIG. 9 is a flowchart illustrating a process for determining whether transmission power reduction for a particular transmission rate is appropriate, in accordance with an embodiment.

Turning now to a more detailed discussion of the transmission power adjustment logic 120 of FIG. 8, FIG. 9 is a flowchart illustrating an embodiment of the transmission rate adjustment logic 112 and a portion 120A of the transmission power adjustment logic 120 of FIG. 8. Portion 120A is a first portion of the transmission power adjustment logic 120 that determines whether transmission power reduction for a particular transmission rate is appropriate, as discussed in decision block 78 of FIG. 7. As previously mentioned, the transmission power adjustment logic 120 is implemented when the transmission rate is maintained (block 118). Once the transmission rate is maintained, portion 120A is implemented.

As illustrated in FIG. 9, in some embodiments, a counter 140 may be provided in portion 120A of the transmission power adjustment logic 120. In such embodiments, the counter 140 may provide an indication of a duration of a maintained transmission rate and/or the number of iterations of the step down process where a current transmission power has been maintained. For example as indicated by counter 140, each time portion 120A of the transmission power adjustment logic 120 is implemented, the counter increases by 1, indicating that the transmission rate and/or transmission power has been maintained. At decision block 142, a determination is made as to whether the counter has reached a threshold duration (represented by "X"). If the threshold duration has not been reached, transmission rate adjustment logic 112 is restarted at flow point "A." However, when the threshold duration is reached, additional transmission power step-down processing continues. Accordingly, the counter 140 may ensure that a threshold duration of maintained transmission rate is reached prior to proceeding with further transmission power reduction.

In some embodiments, an additional counter of the portion 120A of the transmission power adjustment logic 120 may indicate the number of times a transmission power step-down has occurred. For example, a transmission power adjustment counter 141 may count each time a transmission power step-down occurs and a determination may be made as to whether the transmission power adjustment counter 141 has reached a threshold number of transmission-power-step-downs (decision block 143). If the threshold number has been breached, the rate adjustment logic 112 is restarted at flow point "A," skipping transmission power step-downs. However, when the threshold is not breached, additional transmission power step-down processing continues. Additionally and/or alternatively similar counter logic may be used in the power adjustment margin calculation logic, as will discussed in more detain with regard to FIG. 12.

When each of the threshold criteria is met, additional determinations may be made to discern whether low transmission power mode is appropriate. For example, as mentioned above, transmission channel instability may be incompatible with transmission power step downs. In the current embodiment, factors which might affect transmission channel stability may be sensed, to determine whether low transmission power mode is appropriate. For example, as discussed above, movement of the electronic device 10 may cause instability of the transmission channel, due to movement of transmission radios of the electronic device 10. Further, as will be discussed in more detail below, location of the electronic device 10 on a user's body and/or head may impact a determination as to whether low transmission power mode is appropriate. Accordingly, a low transmission power mode check 144 may be implemented. For example, a determination of movement of the electronic device 10 and/or if the electronic device 10 is positioned on an operator's body and/or at the operator's head may be ascertained by sensor data provided by sensors (e.g., Doppler, gyroscopic, accelerometer, etc.) of the electronic device 10.

Other factors may also impact the low transmission power mode check 144. For example, a low battery indication provided by the electronic device 10 may indicate a preference to enter low transmission power mode, whereas a high battery power indication or continuous power source indication may indicate a preference to refrain from entering low transmission power mode.

Further, applications running on the electronic device 10 and/or application parameters of the applications running on the electronic device 10 may impact the low transmission power mode check 144. For example, an indication that applications that use high data throughput and/or require a high quality of service (QoS) are running on the electronic device 10 may indicate a preference to refrain from entering low transmission power mode. Conversely, an indication that applications that use low data throughput and/or do not require a high quality of service (QoS) are running on the electronic device 10 may indicate a preference to enter low transmission power mode.

Additionally, an indication of particular content streaming on the electronic device 10 may affect the low transmission power mode check 144. For example, high quality (e.g. high definition) content may require more data throughput than lower quality content (e.g., low resolution content). Accordingly, an indication that high quality content is streaming on the electronic device 10 may indicate a preference to refrain from entering low transmission power mode. Conversely, an indication that lower quality content is streaming on the electronic device 10 may indicate a preference to enter low transmission power mode.

Based upon the low transmission power mode check 144, the electronic device 10 may determine whether or not to proceed to low transmission power mode (decision block 146). When the low transmission power mode check 144 indicates that the electronic device 10 should not proceed to low transmission power mode (e.g., when transmission power reduction is not appropriate), the rate adjustment logic 112 of FIG. 9 is restarted without any transmission power reduction, as indicated by flow point "A." Conversely, when the low transmission power mode check 144 indicates that the electronic device 10 should proceed to low transmission power mode, transmission power reduction may continue, as indicated by flow point "B."

Figure 10:
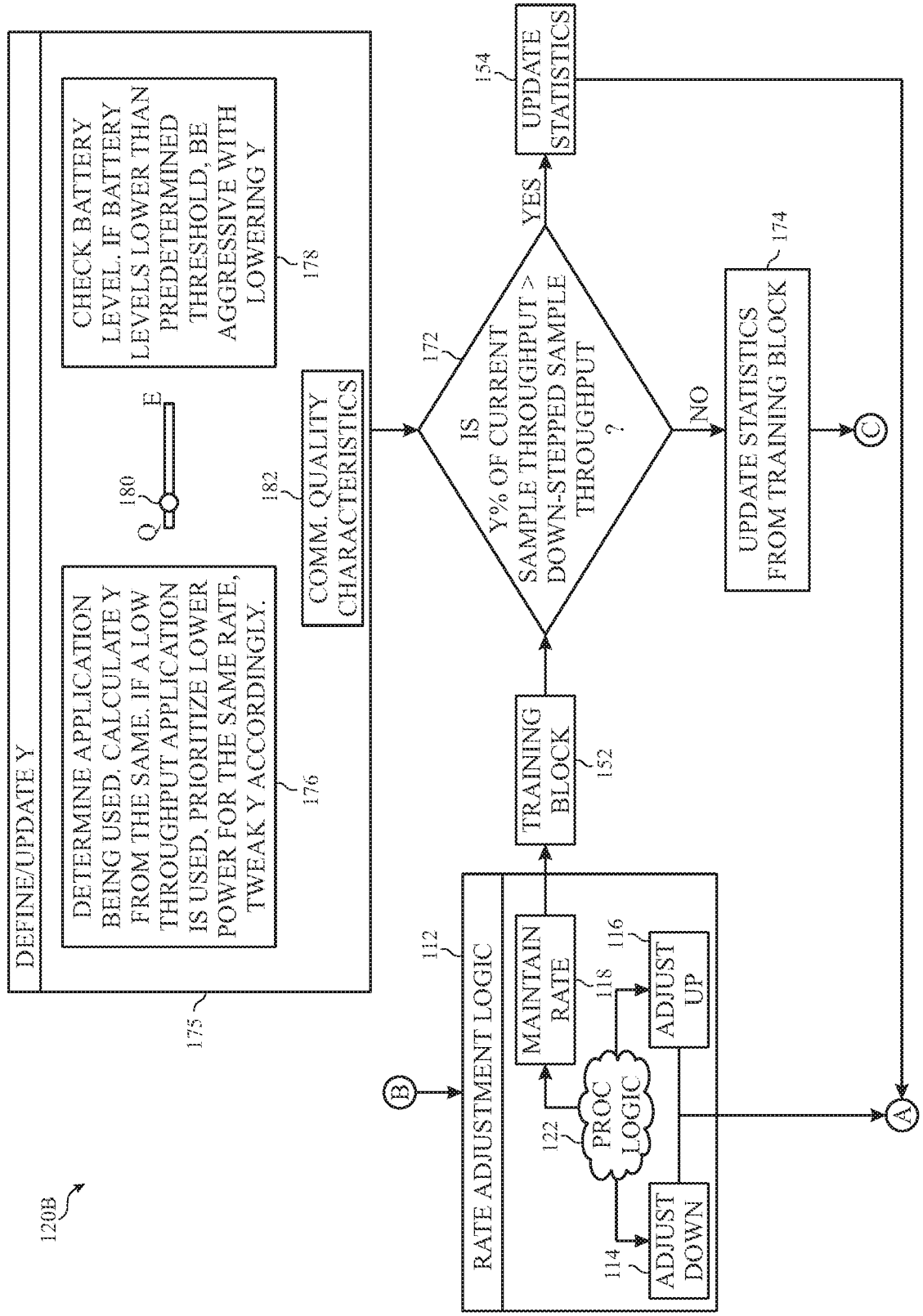
FIGS. 10 and 11 are flowcharts illustrating a process for stepping down transmission power for a transmission rate, in accordance with an embodiment.

FIG. 10 is a flowchart illustrating portion 120B of transmission power adjustment logic 120 for stepping down transmission power for a particular transmission rate, in accordance with an embodiment.

As illustrated, portion 120B continues from the flow point "B" of FIG. 9 to flow point "B" of FIG. 10. Similar to FIGS. 8 and 9, transmission rate adjustment logic 112, via processing logic 122, may adjust the transmission rate down (block 114), adjust the transmission rate up (block 116), or maintain the transmission rate (block 118). If the transmission rates are adjusted up or down, processing continues from flow point "A" of FIG. 9, without transmission power modification.

However, when the transmission rate is maintained, a training block 152 may determine and/or extrapolate statistics for the current transmission rate with a step-down in transmission power (e.g., 0.5 db, 1 dB, or 2 dB power back off). For example, the training block 152 may determine a probability of errors based upon sampled error rates at the reduced transmission power. A probability of success rate may be determined based upon a probability of errors accumulated during a sampling process. The probability of success rate is 1 minus the probability of error rate (which, in some embodiments, may be provided by the receiving electronic device). The down-stepped sample data throughput may be extrapolated using the probability of success rate and the physical layer (PHY) rate.

In some embodiments, a sample data throughput threshold determination is made, indicating whether or not down-stepped transmission power should be implemented. For example, in the current embodiment, a determination is made as to whether a certain power adjustment margin (Y %) of the current sample data throughput (e.g., the sample data throughput prior to down-stepping transmission power) is greater than the down-stepped sample data throughput derived in the training block 152 (decision block 172).

When the determination of decision block 172 is yes, the current transmission rate and current transmission power are used. The statistics (e.g., the probably of success and sample data throughput) are updated (block 154) based upon the current transmission rate without down-stepped transmission power. The rate adjustment logic 112 of FIG. 9 is restarted using the updated statistics from block 154, as indicated by flow point "A."

However, when the determination of decision block 172 is no, the current transmission rate is used with a down-stepped transmission power and the statistics (e.g., the probability of success and sample data throughput) are updated based upon the training block 152, as illustrated in block 174.

As may be appreciated, the power adjustment margin (Y % value) determines how aggressively to down-step the transmission power. Accordingly, factors such as the particular application of the communication (e.g., gaming, music, low-definition video streaming, high-definition streaming, etc.), device characteristics, and/or communication quality characteristics may be used to define and/or update the Y % value (block 175). For example, when lower-data-throughput applications are being used, the Y % value may be set such that there is a lower bar to triggering a down-step in transmission power (as indicated by block 176). Further, Y may be set such that there is a lower bar to triggering a down-step in power when battery levels are lower than a predetermined threshold (as indicated by block 178). In some embodiments, a graphical-user-interface (GUI) may be provided to an operator of the electronic device, which enables the operator to indicate a quality level and/or battery preservation level for the communication. For example, sliding bar 180 allows an operator to select between quality of communication and energy preservation. As the sliding bar 180 approaches energy preservation, the Y value may increasingly lower the bar to trigger a step-down in transmission power. Conversely, when the sliding bar 180 approaches the quality indication, the Y value may be modified to less-aggressively down-step the transmission power, resulting in higher-quality communication. Further, in some embodiments, communication quality characteristics 182, such as a distance between the electronic device and the receiving electronic device may be used to modify the Y value (where closer communication may indicate that lower transmission power may be useable, thus resulting in a Y value that provides a lower bar to triggering a down-step in transmission power.

Figure 11:
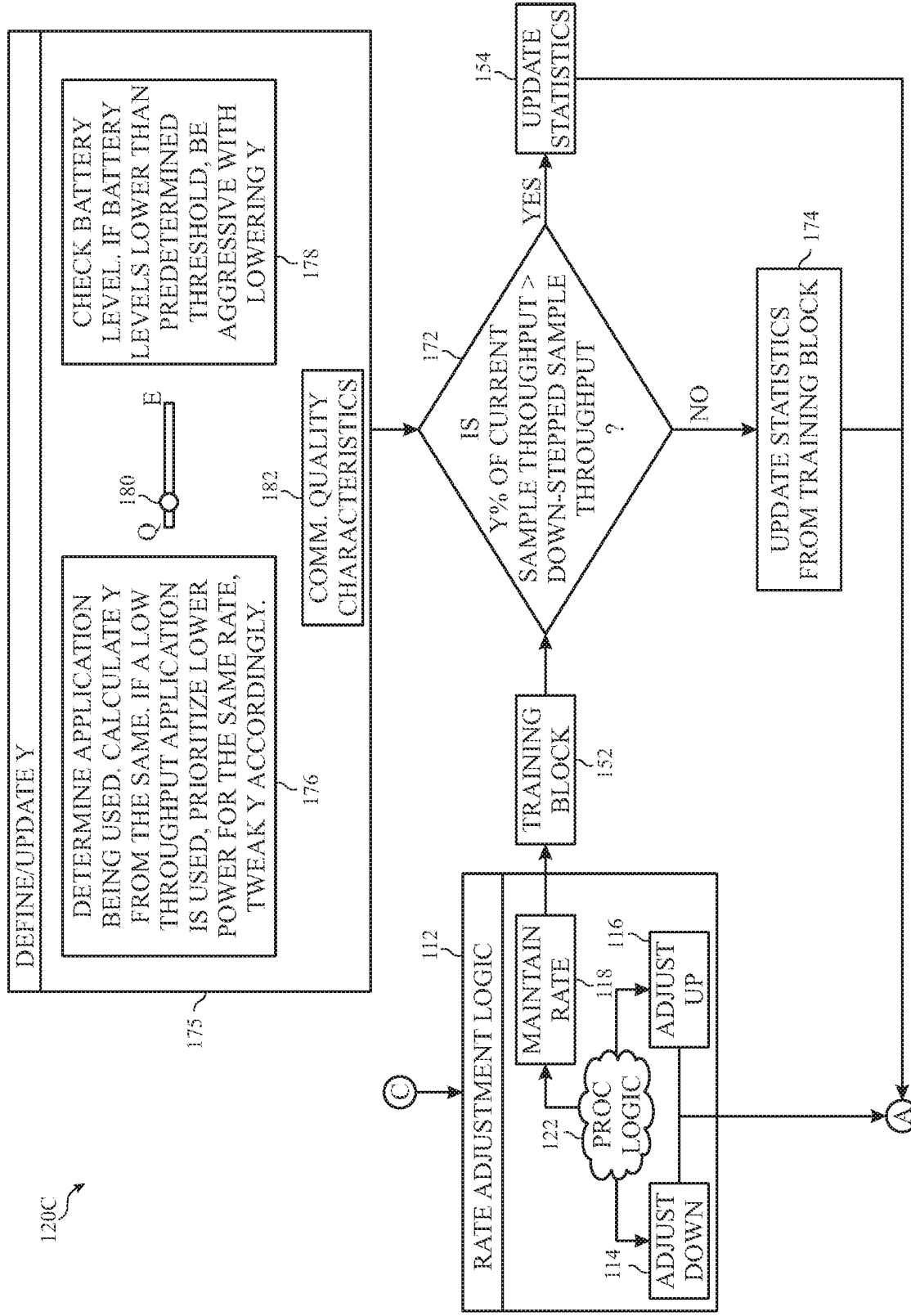

As illustrated in FIG. 10, once a down-step in transmission power is implemented and the statistics are updated based upon the down-step (block 174), processing continues to flow point "C" of portion 120C of FIG. 11. Portion 120C checks to see if transmission rate can be maintained at the down-stepped transmission power. As discussed above, the transmission rate adjustment logic 112, via the processing logic 122, determines whether the transmission rate should be adjusted up, adjusted down, or maintained. If the transmission rate cannot be maintained at the reduced transmission power (e.g., because the data throughput is too low), the transmission rate adjustment logic 112 adjusts the transmission rate down (block 114) and/or adjusts the transmission rate up (block 116), returning to full transmission power and restarting the rate adjustment logic 112 of FIG. 9, as indicated by flow point "A." However, when the transmission rate can be maintained, the transmission rate adjustment logic 112 may maintain the current transmission rate (block 118), accordingly.

Once again, when the transmission rate is maintained, the training block 152 may determine and/or extrapolate statistics for a one-step transmission power back off (e.g., 0.5 dB, a 1 dB, or 2 dB transmission power back off). Further, decision block 172 and blocks 154 and 174 may be implemented, similar to FIG. 10, which may result in additional down-stepping of transmission power. Down-stepping may continue until a certain number of iterations of down-stepping occur and/or the device no longer meets the threshold requirements of the Y % value. For example, as mentioned previously in the discussion of FIG. 9, the counter 140 and/or the transmission power adjustment counter 141 may be used to determine whether additional down-stepping may be implemented (e.g., decision block 142 and/or decision block 143).

Figure 12:
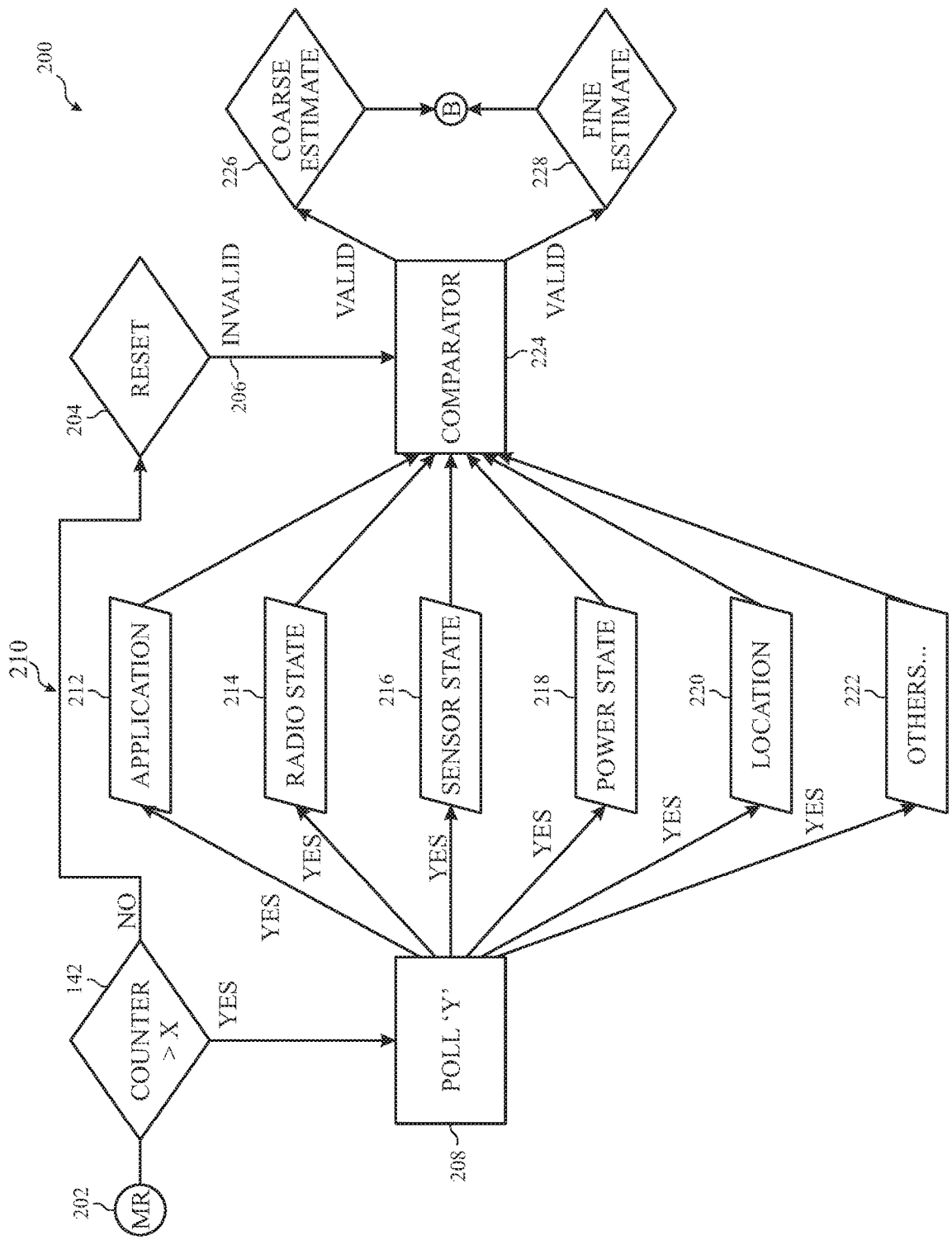
FIG. 12 is a flowchart illustrating a process for determining a power adjustment margin (Y % value), in accordance with an embodiment.

Turning now to a more detailed discussion of the power adjustment margin (Y % value) definition and/or updating (e.g., block 175 of FIGS. 10 and 11), FIG. 12 illustrates a process 200 for power adjustment margin definition and/or updating. When the transmission rate adjustment logic 112 of FIG. 9 results in a maintained transmission rate (e.g., at starting point "MR" 202), decision block 142 and/or decision block 143 may be implemented (e.g., as discussed above regarding FIG. 9). For example, the decision block 142 may determine if a transmission rate has been maintained for a certain threshold amount of time "X" and/or decision block 143 (not depicted) may determine whether a number of transmission power step-downs has been breached. If the transmission rate has not been maintained for the threshold amount of time and/or the threshold number of step-downs has been breached, the step-down in transmission power may be skipped. Accordingly, the Y value may be reset 204, invalidated 206, and/or otherwise modified to indicate that the step-down in transmission power should be skipped. However, when the transmission rate has been maintained for the threshold duration (e.g., "X") and/or a threshold number of step-downs has not been breached, the Y % value may be refreshed or polled 208. Polling 208 may obtain information related to factors 210 that may be useful to derive a desired aggressiveness for down-stepping the transmission power via a power adjustment margin (Y % value) that controls the aggressiveness of the down-stepping of the transmission power. As used herein, determining an aggressiveness of the down-stepping and determining the power adjustment margin may be used interchangeably, as the power adjustment margin directly impacts the aggressiveness of the transmission power step-downs.

Factors such as: application factors 212, a radio state 214, sensor states 216, power states 218, location 220 information, and/or other factors 222 may be used alone or in combination to determine the power adjustment margin (Y % value). For example, the application factors 212 may determine certain factors of applications running on an electronic device 10. In one embodiment, a data throughput of an active application (or aggregation of active applications) may affect a determined aggressiveness of down-stepping or power adjustment margin. For example, when lower-data-throughput applications are being used, more aggressive down-stepping may be desired. In contrast, when higher-data-throughput applications are being used, less aggressive down-stepping may be desired.

The radio state 214 may indicate whether the radio used for the communications is Wi-Fi, cellular, Bluetooth low energy (BLE), near field communications (NFC), etc. For radios with relatively higher communications stability (e.g., Wi-Fi), the down-stepping may be more aggressive. In contrast, radios with relatively lower communications stability may result in down-stepping that is less aggressive. In some embodiments, a lookup table may provide particular power adjustment margins for particular transmission rates used for certain radios. For example, a lookup table may specify particular power adjustment margins to be used when particular Wi-Fi transmission rates are being used.

Additionally, sensor states 216 may be used to modify the power adjustment margin (Y % value). For example, Doppler, gyroscopes, accelerometers, etc. may be used to determine a relative movement of the electronic device 10, whether the electronic device 10 is worn on a body, is positioned at an operator's head, etc. Transmission power down-stepping may be more aggressive when electronic device 10 is relatively stable or has predictably stable movement (e.g., a phone near an operator's head). In contrast, transmission power down-stepping may be less-aggressive when electronic device 10 is relatively unstable (e.g., higher amount of movement) or has predictably unstable movement (e.g., a watch worn on a wrist during a run).

Power state 218 may also affect the power adjustment margin (Y % value). For example, when the electronic device 10 has a relatively low power level (e.g., when plugged into a power source and/or not plugged into a power source), it may be desirable to be more aggressive in down-stepping the transmission power (e.g., to enter a "low power" or power-savings mode). For example, this may help in rapid recharging of the electronic device 10 when the electronic device 10 has low power, but is attached to a power source. However, in some embodiments, when the electronic device 10 is plugged into a power source and/or maintains a high power level, it may be desirable to be less aggressive in down-stepping the transmission power, since power conservation may be less of a priority.

The location 220 of the electronic device 10 may also be used to impact the power adjustment margin (Y % value), as well. For example, when the electronic device 10 is in a known location (e.g., an operator's home), certain information relating to communications in that environment may be known (e.g., reduced transmission power has sufficient results within the operator's home, certain uses are predictable within the known environment, etc.). This information may be used to determine the aggressiveness of the down-stepping that is desirable. For example, when the electronic device 10 is performing an unattended action (e.g., software update) at home at a time when an operator is typically not on the electronic device (e.g., 1:00 AM), it may be desirable to more aggressively down-step the transmission power, as the electronic device 10 communication demands may be low and/or communication quality of service (QoS) may be less of a priority during unattended electronic communications. When the location 220 is in an unknown location, the aggressiveness of the down-stepping may be reduced, as the location 220 factors may be unpredictable.

Other factors 222 may also play a role in the aggressiveness of the down-stepping. For example, a casing material of the electronic device 10 may impact the aggressiveness of down-stepping/power adjustment margin, etc. Additionally, as mentioned above, a number of previous step-downs may be a factor in determining an aggressiveness of subsequent down-stepping. For example, a counter may indicate the number of times a transmission power step-down has occurred. An aggressiveness of subsequent down-stepping may be determined based at least in part on the number of previous transmission power step-downs. For example, in some embodiments, the fewer previous step-downs at a given transmission rate may indicate that the subsequent transmission power step-down can be relatively aggressive. Further, when a relatively large number of prior step-downs have occurred at the given transmission rate, the subsequent transmission power step-down may be relatively less aggressive. In some embodiments, once a threshold number of transmission power step-downs have occurred at the given transmission rate, subsequent transmission power step downs for the given transmission rate may be blocked.

Based upon the factors 210, a comparator 224 may determine relative weights to apply to each of the factors 210. For example, the weights may act to prioritize certain of the factors 210 (e.g., power state 218 and sensor state 216) over other of the factors 210 (e.g., other factors 222). Further, some of the factors 210 may be ignored. In some embodiments, a desired level of confidence may impact the comparator 224 processing. For example, the comparator 224 may provide a coarse estimate 226 and/or a fine estimate 228 of the power adjustment margin (Y % value) (for the desired aggressiveness in down-stepping). The fine estimate 228 may be desirable because such estimates may have a higher confidence level. However, the fine estimate 228 may include more complex processing (e.g., by using relatively more of the factors 210 in the comparison of comparator 224), which may be undesirable. Accordingly, in such cases, the coarse estimate 226 may be calculated, which may use less complex processing (e.g., by using relatively fewer of the factors 210 in the comparison of comparator 224). However, the coarse estimate 226 may have a lower confidence level than the fine estimate 228.

As may be appreciated, the techniques described herein may provide efficient power management of electronic devices, while maintaining a particular quality of service in electronic communications of the electronic device. Accordingly, a power source of the electronic device may deplete at a reduced transmission rate, resulting in a more desirable user experience.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
an input/output (I/O) interface configured to facilitate electronic communications with a receiving electronic device, at a particular transmission rate that is dynamically changeable by the electronic device; and
transmission power and transmission rate adjustment circuitry configured to iteratively step-down transmission power one step at a time and determine at each step-down whether the particular transmission rate can be maintained until a threshold number of step-downs greater than one is achieved, unless the particular transmission rate can no longer be maintained.

2. The electronic device of claim 1, wherein the transmission power and transmission rate adjustment circuitry, during operation of the electronic device, is configured to continually:
determine that the particular transmission rate can no longer be maintained, by:
sampling the electronic communications to determine a second transmission rate after adjusting the transmission power down one step within a power adjustment margin; and
comparing the second transmission rate with the particular transmission rate at full transmission power.

3. The electronic device of claim 2, wherein the particular transmission rate can no longer be maintained in response to the second transmission rate being lower than a threshold amount of the particular transmission rate.

4. The electronic device of claim 1, wherein an amount of the iteratively step-down power is determined based on a power adjustment margin, wherein the power adjustment margin varies based on a particular application executed on the electronic device, one or more characteristics of the electronic device, one or more communication quality characteristics of the electronic device, or a combination thereof.

5. The electronic device of claim 1, wherein the electronic device is configured to:
determine one or more characteristics of use of the electronic device useful to determine a tradeoff between communication quality and power usage of the electronic device; and
determine whether to iteratively step-down the transmission power based upon the tradeoff.

6. The electronic device of claim 5, wherein the characteristics of use of the electronic device comprise a current application running on the electronic device, a data throughput of the current application, or both, wherein the tradeoff between communication quality and power usage favors power usage for relatively low-data-throughput applications and favors communication quality for relatively high-data-throughput applications.

7. The electronic device of claim 1, wherein the electronic device is configured to:
determine one or more characteristics of the electronic communications, the characteristics comprising a distance between the electronic device and the receiving electronic device, an error rate of the electronic communications, a radio used for the electronic communications, or any combination thereof; and
determine whether to iteratively step-down the transmission power based upon the distance between the electronic device and the receiving electronic device, the error rate of the electronic communications, the radio used for the electronic communications, or any combination thereof.

8. The electronic device of claim 1, comprising a battery power source, wherein the electronic device is configured to:
determine a power level of the battery power source; and
determine whether to iteratively step-down the transmission power, based at least in part upon the power level.

9. The electronic device of claim 1, wherein the electronic device is configured to:

present a graphical-user-interface requesting an input regarding a tradeoff between communication quality and power usage of the electronic device;

receive the input; and determine whether to iteratively step-down the transmission power, based at least in part upon the input.

10. The electronic device of claim 1, wherein the electronic device is configured to:

determine a number of step-downs in transmission power that have been previously performed at the particular transmission rate, a duration at a current transmission rate, or both; and determine whether to iteratively step-down the transmission power, based at least in part upon the number of step-downs in transmission power, the duration at the current transmission rate, or both.

11. A tangible, non-transitory, machine-readable medium, comprising processor-interpretable instructions to:

facilitate electronic communications via an input/output (I/O) interface of an electronic device at a particular transmission rate that is dynamically changeable by the electronic device; and iteratively step-down a transmission power one step at a time and determine at each step-down whether the particular transmission rate can be maintained until a threshold number of step-downs greater than one is achieved, unless the particular transmission rate can no longer be maintained.

12. The tangible, non-transitory, machine-readable medium of claim 11, comprising processor-interpretable instructions to:

determine that the particular transmission rate can no longer be maintained, by:

sampling the electronic communications to determine a second transmission rate after adjusting the transmission power down one step;

comparing the second transmission rate with the particular transmission rate; and determining that the second transmission rate is lower than the particular transmission rate.

13. The tangible, non-transitory, machine-readable medium of claim 11, comprising processor-interpretable instructions to:

upon each transmission power adjustment, increment a counter; and upon reaching a threshold number at the counter, discontinue further transmission power adjustment.

14. The non-transitory, machine-readable medium of claim 11, comprising processor-interpretable instructions to:

determine a power adjustment margin based upon one or more applications executed on the electronic device, one or more characteristics of the electronic device, one or more characteristics of a current use of the electronic device, one or more characteristics of a communication channel of the electronic communications, or any combination thereof; and determine to iteratively step-down the transmission power used for signal transmission at the particular transmission rate when a sample data throughput of transmission at the step-down in the transmission power reaches a threshold defined by the power adjustment margin.

15. The non-transitory, machine-readable medium of claim 14, comprising processor-interpretable instructions to:

identify movement of the electronic device, based upon data from one or more sensors of the electronic device; and modify the power adjustment margin based upon the movement, such that relatively higher power is used for relatively higher movement and relatively lower power is used for relatively lower movement.

16. The non-transitory, machine-readable medium of claim 14, comprising processor-interpretable instructions to:

identify a data throughput of the current use of the electronic device; and modify the power adjustment margin based upon the data throughput of the current use, such that a higher power is used for a higher data throughput and a lower power is used for a lower data throughput.

17. The non-transitory, machine-readable medium of claim 14, comprising processor-interpretable instructions to:

identify a current battery level of the electronic device; and modify the power adjustment margin based upon the current battery level, such that relatively higher power is used for a relatively higher current battery level and relatively lower power is used for a relatively lower current battery level.

18. The non-transitory, machine-readable medium of claim 14, comprising processor-interpretable instructions to:

identify a location of the current use of the electronic device;

modify the power adjustment margin by an aggressive amount in response to the location indicating that the electronic device is performing an unattended action in a known environment; and modify the power adjustment margin by a lower amount than the aggressive amount in response to the location indicating an unknown location.

19. A processor-implemented method, comprising:

facilitating, via a processor of an electronic device, electronic communications with a target electronic device, at a particular transmission rate that is dynamically changeable by the electronic device; and iteratively stepping-down a transmission power one step at a time and determine at each step-down whether the particular transmission rate can be maintained rate until a threshold number of step-downs greater than one is achieved, unless the particular transmission rate can no longer be maintained.

20. The processor-implemented method of claim 19, wherein the step comprises a 0.5 dB step, a 1 dB step, or a 2 dB step.

* * * * *